US012656779B2

(12) United States Patent　　　(10) Patent No.:　US 12,656,779 B2

Haye et al.　　　(45) Date of Patent:　Jun. 16, 2026

(54) INSPECTION SYSTEM FOR A GAS TURBINE ENGINE

(71) Applicant: RTX CORPORATION, Farmington, CT (US)

(72) Inventors: Sheridon Haye, College Station, TX (US); Jeremiah C. Lee, Coventry, CT (US)

(73) Assignee: RTX CORPORATION, Farmington, CT (US)

( * ) Notice: Subject to any disclaimer, the term of this patent is extended or adjusted under 35 U.S.C. 154(b) by 98 days.

(21) Appl. No.: 18/483,722

(22) Filed: Oct. 10, 2023

(65) Prior Publication Data

US 2025/0117012 A1　　Apr. 10, 2025

(51) Int. Cl.
| | |
|---|---|
| *G05D 1/00* | (2024.01) |
| *F02C 7/00* | (2006.01) |
| *G01M 15/14* | (2006.01) |

(52) U.S. Cl.
CPC .............. *G05D 1/0291* (2013.01); *F02C 7/00* (2013.01); *G01M 15/14* (2013.01); *G05D 1/0094* (2013.01); *F05B 2260/83* (2013.01)

(58) Field of Classification Search
CPC ............................ B66F 9/063; B66F 9/07581
See application file for complete search history.

(56) References Cited

U.S. PATENT DOCUMENTS

| | | | |
|---|---|---|---|
| 10,730,185 | B2 | 8/2020 | Walters et al. |
| 11,705,010 | B2 * | 7/2023 | Cronkhite ................ G08G 5/30 |
| | | | 701/122 |
| 11,975,869 | B2 * | 5/2024 | Sweers ................. G06T 7/0004 |
| 2007/0057844 | A1 * | 3/2007 | Kollgaard ............ G01N 29/262 |
| | | | 343/705 |
| 2018/0259955 | A1 * | 9/2018 | Noto ......................... G08G 5/55 |
| 2019/0311203 | A1 * | 10/2019 | Shah ...................... G06V 10/82 |
| 2020/0363822 | A1 * | 11/2020 | Georgeson .......... G01M 5/0016 |
| 2022/0024577 | A1 * | 1/2022 | Stamatovski ............. B64F 3/00 |
| 2022/0108621 | A1 * | 4/2022 | Li .......................... G05D 1/042 |
| 2022/0136405 | A1 | 5/2022 | Graham et al. |
| 2022/0250658 | A1 * | 8/2022 | Blonder ............... G05D 1/0212 |

(Continued)

FOREIGN PATENT DOCUMENTS

| | | | |
|---|---|---|---|
| CN | 112904877 | 6/2021 | |
| CN | 115447774 A | * 12/2022 | ............. B64C 25/24 |

(Continued)

OTHER PUBLICATIONS

English Translation CN 115447774 A (Year: 2025).*

(Continued)

*Primary Examiner* — Rami Khatib

(74) *Attorney, Agent, or Firm* — Carlson, Gaskey & Olds, P.C.

(57) ABSTRACT

An inspection system for a gas turbine engine includes a team of terrestrial drones each equipped with at least one inspection sensor and at least one processor. The processor is configured to choreograph operation of the terrestrial drones to each move along an associated drone-specific inspection path and collectively traverse an area of interest in a gas turbine engine; and operate the inspection sensor of each of the terrestrial drones to collect inspection data along the associated drone-specific inspection path.

13 Claims, 3 Drawing Sheets

(56)                    References Cited

U.S. PATENT DOCUMENTS

2023/0028380 A1*    1/2023   Argote ................... F01D 21/12
2023/0168146 A1      6/2023   Good et al.
2023/0366383 A1*   11/2023   Fujioka .................. F03D 17/00

FOREIGN PATENT DOCUMENTS

CN           115963852  B   *   9/2023
FR             2963431  A1  *   2/2012   ........... G01N 29/225
KR         20210030183  A   *   3/2021   ........... B64C 39/024
WO           2023128008          7/2023

OTHER PUBLICATIONS

English Translation FR 2963431 A1 (Year: 2025).*
European Search Report for European Patent Application No.
24205964.0 mailed Mar. 6, 2025.

* cited by examiner

INSPECTION SYSTEM FOR A GAS TURBINE ENGINE

BACKGROUND

Gas turbine engines are required to be inspected, usually at predetermined intervals according to a maintenance schedule or based on its usage. Such inspections are often invasive, time-consuming, and expensive because the engine (and thus aircraft) is out-of-service during inspection and sometimes, the engine would need to be removed from the aircraft. Inspections, however, are key to identifying distress in engine components, which may then require repair or replacement.

SUMMARY

An inspection system for a gas turbine engine according to an example of the present disclosure includes a team of terrestrial drones each equipped with at least one inspection sensor. At least one processor is configured to choreograph operation of the terrestrial drones to each move along an associated drone-specific inspection path and collectively traverse an area of interest in a gas turbine engine and operate the inspection sensor of each of the terrestrial drones to collect inspection data along the associated drone-specific inspection path.

In a further embodiment of any of the foregoing embodiments, the at least one processor is configured to identify whether there is a need for deviation from the associated drone-specific inspection path and, if there is the need, provide an instruction for the terrestrial drone to deviate from the associated drone-specific inspection path.

In a further embodiment of any of the foregoing embodiments, the need is based on detection of an abnormality along a portion of the associated drone-specific inspection path of a first one of the terrestrial drones, and the instruction is for the first one of the terrestrial drones to retrace the portion of the associated drone-specific inspection path and provide confirmation of the detection of the abnormality.

In a further embodiment of any of the foregoing embodiments, the at least one inspection sensor includes at least one of an imaging device or a tactile sensor. The detection of the abnormality is based on the inspection data of the imaging device or the tactile sensor, and the confirmation of the detection of the abnormality is based on the inspection data of the other of the imaging device or the tactile sensor.

In a further embodiment of any of the foregoing embodiments, the at least one inspection sensor includes at least one of an imaging device or a tactile sensor. The detection of the abnormality is based on the inspection data of the imaging device taken from a first position relative to the associated drone-specific inspection path, and the confirmation of the detection of the abnormality is based on the inspection data of the imaging device taken from a second, different position relative to the associated drone-specific inspection path.

In a further embodiment of any of the foregoing embodiments, the need is based on detection of an abnormality along a portion of the associated drone-specific inspection path of a first one of the terrestrial drones, and the instruction is to summon a second, different one of the terrestrial drones to retrace the portion of the associated drone-specific inspection path and provide confirmation of the detection of the abnormality.

In a further embodiment of any of the foregoing embodiments, the at least one inspection sensor includes at least one of an imaging device or a tactile sensor. The detection of the abnormality is based on the inspection data of the imaging device or the tactile sensor, and the confirmation of the detection of the abnormality is based on the inspection data of the other of the imaging device or the tactile sensor.

In a further embodiment of any of the foregoing embodiments, the at least one inspection sensor includes at least one of an imaging device or a tactile sensor. The detection of the abnormality is based on the inspection data of the imaging device of the first one of the terrestrial drones taken from a first position relative to the associated drone-specific inspection path of the first one of the terrestrial drones, and the confirmation of the detection of the abnormality is based on the inspection data of the imaging device of the second one of the terrestrial drones taken from a second, different position relative to the associated drone-specific inspection path of the first one of the terrestrial drones.

In a further embodiment of any of the foregoing embodiments, the need is based on a time threshold of a first one of the terrestrial drones being exceeded for completing the associated drone-specific inspection path such that there is an uninspected portion of the associated drone-specific inspection path of the first one of the terrestrial drones, and the instruction is to summon a second, different one of the terrestrial drones to move along the uninspected portion of the associated drone-specific inspection path of the first one of the terrestrial drones.

In a further embodiment of any of the foregoing embodiments, the at least one inspection sensor includes at least an imaging device and a tactile sensor.

In a further embodiment of any of the foregoing embodiments, each of the terrestrial drones includes a chassis defining a first, terrestrial side and a second, opposite side, a transparent floor mounted in the chassis, and the at least one inspection sensor includes an imaging device mounted on the chassis and situated to take images of the first side through the transparent floor.

In a further embodiment of any of the foregoing embodiments, the transparent floor includes an array of feelers extending therefrom on the first side.

A gas turbine engine according to an example of the present disclosure includes a compressor section, a combustor in fluid communication with the compressor section, a turbine section in fluid communication with the combustor, and an inspection system as recited in any of the foregoing embodiments.

A method for inspecting a gas turbine engine according to an example of the present disclosure includes deploying a team of terrestrial drones in a gas turbine engine. Each of the terrestrial drones is equipped with at least one inspection sensor. Operation of the terrestrial drones are choreographed to each move along an associated drone-specific inspection path and collectively traverse an area of interest in the gas turbine engine. The at least one inspection sensor of each of the terrestrial drones is operated to collect inspection data along the associated drone-specific inspection path.

A further embodiment of any of the foregoing embodiments includes identifying whether there is a need for deviation from the associated drone-specific inspection path and, if there is the need, providing an instruction for the terrestrial drone to deviate from the associated drone-specific inspection path.

In a further embodiment of any of the foregoing embodiments, the need is based on detection of an abnormality along a portion of the associated drone-specific inspection path of a first one of the terrestrial drones, and the instruction is for the first one of the terrestrial drones to retrace the portion of the associated drone-specific inspection path and provide confirmation of the detection of the abnormality.

In a further embodiment of any of the foregoing embodiments, the need is based on detection of an abnormality along a portion of the associated drone-specific inspection path of a first one of the terrestrial drones, and the instruction is to summon a second, different one of the terrestrial drones to retrace the portion of the associated drone-specific inspection path and provide confirmation of the detection of the abnormality.

In a further embodiment of any of the foregoing embodiments, the need is based on a time threshold of a first one of the terrestrial drones is exceeded for completing the associated drone-specific inspection path such that there is an uninspected portion of the associated drone-specific inspection path of the first one of the terrestrial drones, and the instruction is to summon a second, different one of the terrestrial drones to move along the uninspected portion of the associated drone-specific inspection path of the first one of the terrestrial drones.

The present disclosure may include any one or more of the individual features disclosed above and/or below alone or in any combination thereof.

BRIEF DESCRIPTION OF THE DRAWINGS

The various features and advantages of the present disclosure will become apparent to those skilled in the art from the following detailed description. The drawings that accompany the detailed description can be briefly described as follows.

Figure 1:
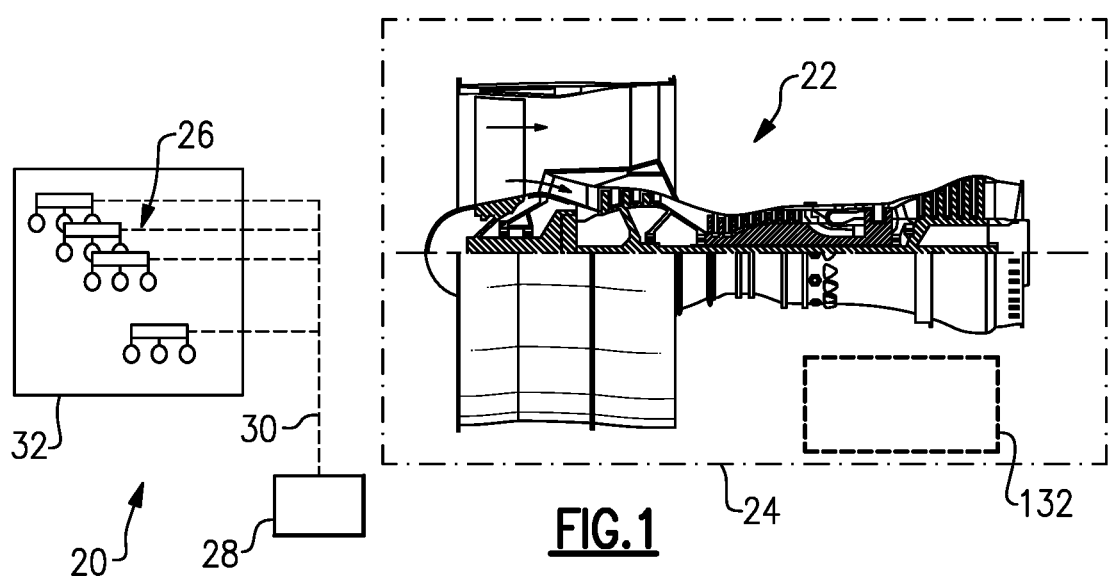
FIG. 1 illustrates an inspection system for a gas turbine engine.

In this disclosure, like reference numerals designate like elements where appropriate and reference numerals with the addition of one-hundred or multiples thereof designate modified elements that are understood to incorporate the same features and benefits of the corresponding elements. Terms such as "first" and "second" used herein are to differentiate that there are two architecturally distinct components or features. Furthermore, the terms "first" and "second" are interchangeable in that a first component or feature could alternatively be termed as the second component or feature, and vice versa.

DETAILED DESCRIPTION

FIG. 1 schematically illustrates an inspection system 20 for examination of a gas turbine engine 22 that is associated with an aircraft, which is generally designated at 24. As will be appreciated from this disclosure, the system 20 provides for automated, intelligent inspection that may reduce or replace the need for manual inspection in which maintenance personnel must enter the engine 22, particularly engines with long inlets that are confined and unconducive to easy manual inspection.

The system 20 includes a team of terrestrial drones 26 and a controller 28. The term "terrestrial" refers to the ability of the drones 26 to move across surfaces, such as the surfaces of components in the engine 22, as opposed to flying above a surface (e.g., a quadcopter). The controller 28 is in communication with the drones 26, such as by a wired or wireless connection 30. In general, the drones 26 are miniature in size so as to be able to enter into the engine 22 and maneuver therein with clearance to be able to rotate and traverse the engine components being inspected.

In the example shown, the system 20 includes a docking station 32 from which the drones 26 deploy for inspection of the engine 22. For example, the system 20 as shown is a "non-dedicated" system that is remotely located from the aircraft 24. In that regard, the docking station 32 may be mobile, such as on a wheeled cart or vehicle such that it can be moved to into proximity of the engine 22 or moved to service multiple engines across different aircrafts. Alternatively, however, the system 20 is a "dedicated" system that is intended to service the engine or engines of a single aircraft and, in that regard, the docking station 32 is on the aircraft 24, as designated at 132. The docking station 32 (or 132) serves as base for deployment and return of the drones 26, but may also be configured to refuel or recharge the drones 26, and may include a computerized device or other electronics for communicating with and/or controlling movement and operation of the drones 26.

Figure 2:
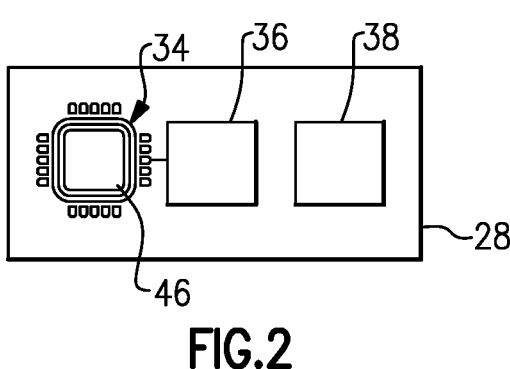
FIG. 2 illustrates a controller for operating a team of terrestrial drones.

FIG. 2 illustrates the controller 28, which in this example includes at least one processor 34, a memory 36, and, optionally, an operator interface 38, such as a screen, keyboard, and/or input device (e.g., a mouse). In one example, the controller 28 is in the docking station 32, but it may alternatively be in a computerized device (e.g., a tablet), in the drones 26, or split among the drones 26, the docking station 32, and/or a computerized device. Instructions for operating the drones 26 and their equipment are saved in the memory 36 and executed by the processor or processors 34. In that regard, there may be multiple processors 34 located across the drones 26, the docking station 32, and/or computerized device or devices that participate in executing the instructions as well as multiple memories 36 located across the drones 26, the docking station 32, and/or computerized device or devices that participate in control of the drones 26.

The processor or processors 34 are configured with instructions that, when executed, choreograph operation of the drones 26 to inspect one or more areas of interest of the engine 22. As an example, an area of interest may be, but is not limited to, a fan (e.g., fan blades and/or vanes), a compressor (e.g. compressor blades and/or vanes), or a turbine (e.g., turbine blades, vanes, or seals). The term "choreograph" refers to the coordinated movements of the drones 26 to collectively inspect the area of interest in the engine 22.

Figures 3, 4:
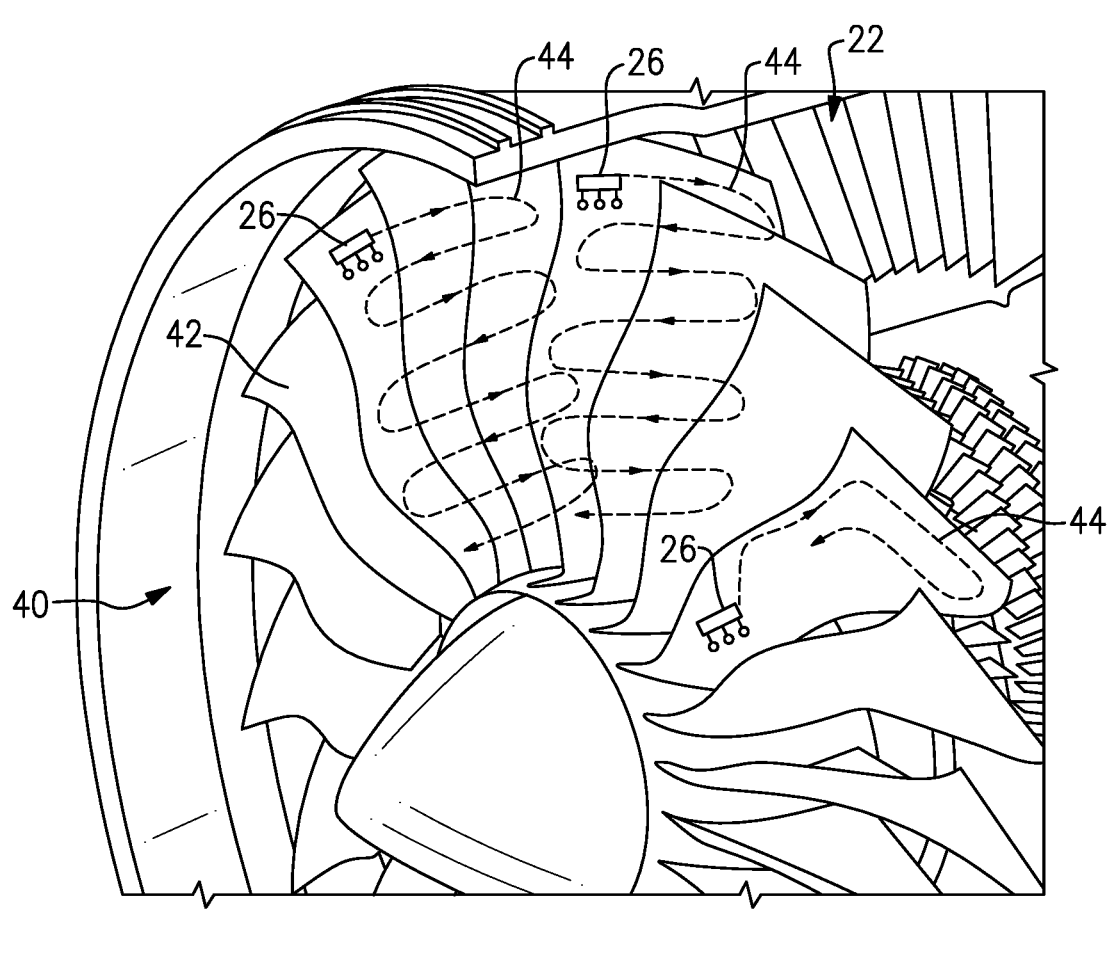
FIG. 3 illustrates drone-specific inspection paths for inspection of an area of interest.
FIG. 4 illustrates a detection-based deviation of a terrestrial drone from its path.

FIG. 3 illustrates an example based on a fan section 40 of the engine 22, which includes fan blades 42. It is to be understood, however, that the examples herein are applicable to other sections of the engine 22. The processor or processors 34 are configured to choreograph operation of the drones 26 with each moving along an associated drone-specific inspection path 44 and collectively traverse the area of interest. The path 44 can be predetermined or determined "on-the-fly" using a heuristic algorithm (e.g., heading to the next goal point while minimizing a cost function which may include distance, time, number of turns, or surface curvature. In this regard, each drone 26 is assigned a different unique path 44 to move along and inspect, although the paths 44 may intersect or include portions that are common to multiple paths 44. For instance, the drones 26 may navigate based upon one or more reference locations in the engine 22 that are identified by one or more sensors in the drones 26. The drones 26 may also concentrate their search in regions determined by one or more of the drones 26 to have a high concentration of abnormalities. The drones 26 may also have navigational mapping information about the engine model stored in the memory 36 that the drones 26 utilize to move and operate.

Each of the drones 26 examines the area of interest along its path 44 to collect inspection data. For example, the drones 26 take images and/or surface topography measurements (tactile sensing) in order to identify potential abnormalities on the components of the engine 22. An abnormality may be a dent, a crack, a region of corrosion, or other region of distress that is optically or topographically differentiated from regions of the component that contain no abnormalities. In this regard, the processor 34 (FIG. 2) can include one or more neural networks or other machine learning algorithms 46 that are configured to identify such abnormalities. A machine learning algorithm is utilized to determine if the sensor signal corresponds to a defect of interest. There are numerous algorithms to perform such task. One example is a neural network in its various forms which may or may not require pre-training. A neural network is a network of artificial neurons or nodes that are operable for artificial intelligence learning and problem-solving. The neural network 46 is trained beforehand based on examples of inspection data (real or virtual) with and without abnormalities so the processor 34 can analyze instant inspection data collected by the drones 26 and identify, based on the training, whether there is an abnormality. If an abnormality is identified, the component containing the abnormality may be subject to repair or replacement.

But for a need to intervene, each drone 26 will complete its inspection along its path 44 and then return to the docking station 32 or continue on to a new path in another area of interest. For each drone 26 the processor 34 identifies during the inspection whether there is a "need" for deviation from the path 44. If there is an identified need, the processor 34 provides an instruction for the drone 26 to deviate from its path 44 in a manner that depends on the nature of the need. For instance, a need is detection-based or time-based, examples of which are discussed in more detail below.

FIG. 4 demonstrates a detection-based need in which an abnormality 48, such as obstacle or the edge of a fan blade, is detected by the drone 26 (i.e. a first one of the drones 26) along a portion 50 of its path 44. The detection of the abnormality 48 is identified by the processor 34 as a need to deviate the drone 26 from its path 44. The processor 34 responsively provides an instruction for the same drone 26 to move along deviation path 52 to retrace the portion 50 of the path 44 and provide confirmation of the detection of the abnormality 48. That is, if an abnormality 48 is detected, the drone 26 re-inspects the portion 50 in order to confirm the presence of the abnormality 48. The deviation path 52 may be off of the path 44, on the path 44, or partially on and partially off of the path 44. For instance, the route of the deviation path 52 may be a shortest distance path between an instant location of the drone 26 and the portion 50 that is to be retraced. In one example, the re-inspection can be done with the same sensor so as to obtain confirmation or can also be conducted using a different inspection sensor on the drone 26. For instance, if the abnormality is initially detected based on imaging inspection data, the re-inspection is conducted based on topographical inspection data, or vice versa. In any case, the drone 26 in the example above demonstrates a self-sufficient control scheme, as the detection of the abnormality 48 and the re-inspection of the abnormality 48 are conducted by a single drone 26.

Figure 5:
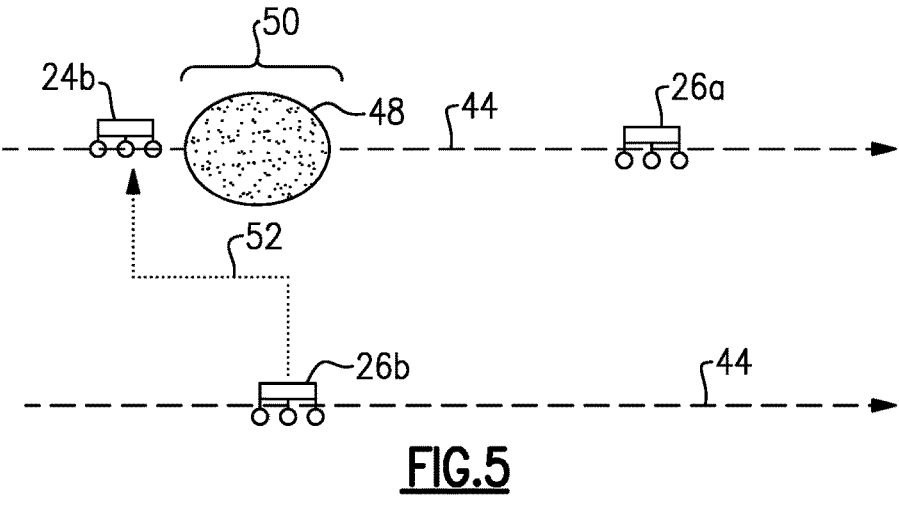
FIG. 5 illustrates a detection-based deviation of a second drone from its path in order to re-inspect a portion of a path of a first drone.

FIG. 5 demonstrates another example of a detection-based need, but involving two drones 26a/26b, i.e. an interdependent control scheme. Here, the abnormality 48 is detected by the first drone 26a along the portion 50 of the path 44. The detection of the abnormality 48 is identified by the processor 34 as a need to deviate a second drone 26b from its path 44. The processor 34 responsively provides an instruction to summon the second drone 26b to move along deviation path 52 to retrace the portion 50 of the path 44 and provide confirmation of the detection of the abnormality 48. That is, if an abnormality 48 is detected, the drone 26b re-inspects the portion 50 in order to confirm the presence of the abnormality 48. In one example, the re-inspection with the second drone 26b is conducted using a different inspection sensor on the drone 26b than was used by the first drone 26a to initially detect the abnormality 48. For instance, if the abnormality 48 is initially detected based on imaging inspection data, the re-inspection is conducted based on topographical inspection data, or vice versa. The use of a different inspection sensor may avoid interferences that might have caused a false identification of the abnormality 48 by the first drone 26a, but also provides additional inspection data that may be useful for determination of other characteristics of the abnormality 48, such as its type or size.

The processor 34 can be programmed to employ the self-sufficient control scheme or the interdependent control scheme, or programmed to selectively choose between these schemes, depending on one or more other factors. Such factors may include, but are not limited to, the locations of the drones 26 relative to one another, the extent of the path 44 that a drone 26 has completed, or proximity of a drone 26 to the path 44 of another drone 26 or to an abnormality 48. As an example, if a first drone 26 identifies an abnormality 48 and all of the other drones 26 of the team are located far away, the self-sufficient scheme may be selected since the first drone 26 is likely to be closest to the abnormality 48. Alternatively, if the drones 26 are located relatively close together and a drone 26 has completed its path 44 and is in close proximity to an abnormality 48 that is identified by another drone 26, then the interdependent scheme may be selected.

Figure 6:
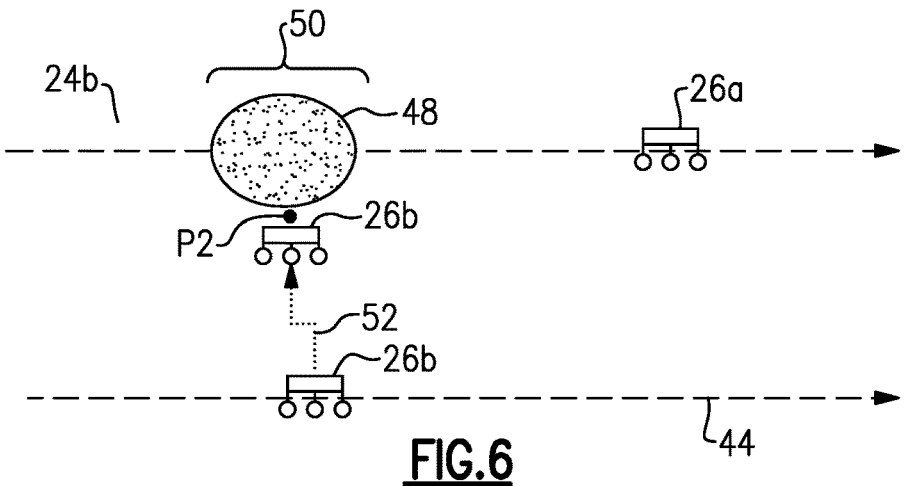
FIG. 6 illustrates a detection-based deviation of a second drone from its path a second position in order to re-inspect a portion of a path of a first drone.

The example demonstrated in FIG. 6 is similar to that of FIG. 5, except that the abnormality 48 is detected by the first drone 26a at or near a position P1 (P1 or P1?) along the portion 50 of the path 44. The processor 34 responsively provides an instruction summon the second drone 26b to move along deviation path 52, but instead of moving to retrace the portion 50 of the path 44 of the first drone 26a, the confirmation of the detection of the abnormality 48 is based on inspection data taken from a second, different position P2 relative to the path 44 of the first drone 26a. That is, if an abnormality 48 is detected, the second drone 26b re-inspects the portion 50 in order to confirm the presence of the abnormality 48, but does so from a different angle. In that regard, imaging of the abnormality 48 from the different angle may avoid obstructions or other interferences that might have caused a false identification of the abnormality 48 by the first drone 26a, and thus facilitates providing a more reliable confirmation of the presence of the abnormality 48. The position P2 may be a preprogrammed location relative to P1, such as a position that is a predetermined distance and direction from P1, or relative to a reference location associated with the path 44. Similarly, a modified version of the example of FIG. 4 includes instructing the drone 26 to move to a second position that is off the path 44 instead of retracing the portion 50 along the path 44.

Figure 7:
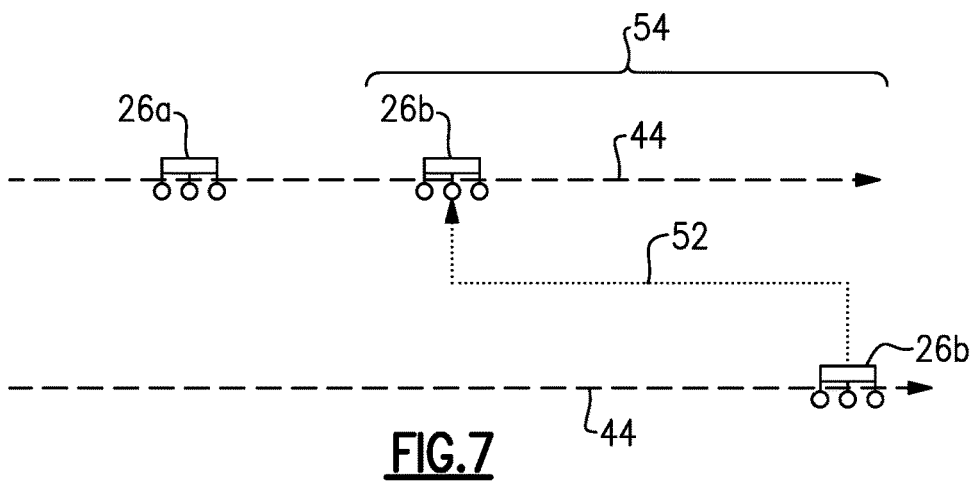
FIG. 7 illustrates a time-based deviation of a second drone from its path in order to inspect an uninspected portion of a path of a first drone.

FIG. 7 demonstrates a time-based need, where the identification of the need is based on a time threshold of a first drone 26a being exceeded for completing its path 44 such that there is an uninspected portion 54 of the path 44 of the first drone 26a. The exceeding of the time-threshold is identified by the processor 34 as a need to deviate a second drone 26b from its path 44. The processor 34 responsively provides an instruction to summon a second drone 26b to take deviation path 52 and move along the uninspected portion 54 of the path 44 of the first drone 26a. That is, if the first drone 26a is unable to complete its inspection within an expected amount of time, the second drone 26b is summoned in order to complete the inspection of the remaining portion of the path 44 of the first drone 26a. For example, the first drone 26a may be delayed by the presence and inspection of multiple abnormalities. By summoning the second drone 26b, the inspection time for the entire area of interest can be made more efficient. For instance, the second drone 26b that is summoned is a drone 26 that has already completed, or is close to completing, its own path 44. As will be appreciated, additional time thresholds may be utilized to summon one or more additional drones 26 if the second drone 26b also becomes delayed.

Figure 8:
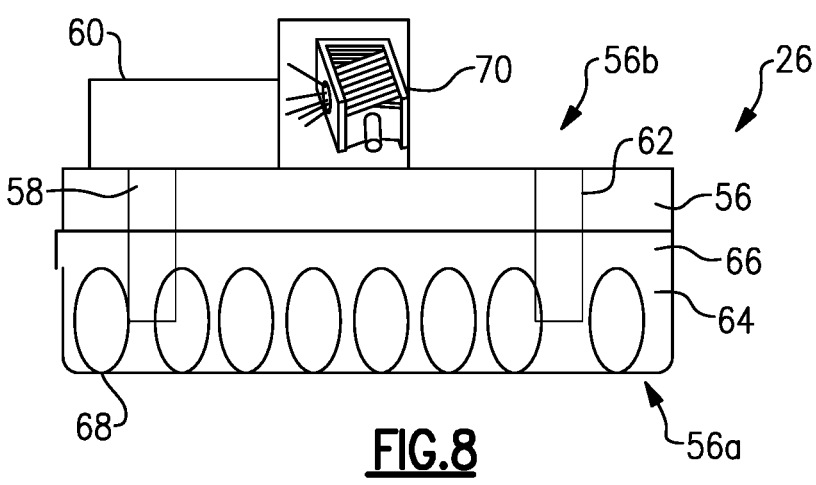
FIG. 8 illustrates an example of a terrestrial drone.

FIG. 8 illustrates a representative example of one of the drones 26. It is to be understood that the configuration of the drone 26 and inspection sensor or sensors are adaptable to the particular inspection environment in which the drones 26 are to be employed. As shown, the drone 26 includes a chassis 56. The chassis 56 serves as a structural support frame for mounting and carrying subcomponents of the drone 26. The chassis 56 defines a first, terrestrial side 56a and a second, opposite side 56b. The first side 56a is the side that faces toward the surface of the component being inspected. The chassis 56 carries a locomotion device 58, which may include, but is not limited to, a motor, wheels and/or legs. A power module 60 includes a power source, such as a battery, and electric circuits for controlling operation of the drone 26, such as the microprocessor 34. As the drone 26 will need to be in a variety of operational orientations on a component that is being inspected, the drone 26 must cling to the component surface. In that regard, the drone 26 may utilize electrostatics, hooks, tacky gel, vacuum, or combinations or these to facilitate clinging to the surface.

In the illustrated example, the drone 26 is configured to cling by vacuum and includes a vacuum pump 62 that is operable to create suction on the terrestrial side 56a. A flexible curtain 64 is provided around the perimeter of the chassis 56 on the terrestrial side 56a to help maintain the vacuum with the surface.

The drone 26 in this example also includes a flexible, transparent floor 66, such as a layer formed of silicone. The floor 66 includes an array of feelers 68 extending therefrom on the terrestrial side 56a. The feelers 68 and floor 66 serve as one of the inspection sensors of the drone 26, i.e. a tactile sensor. For instance, the feelers 68 move across the surface and exert pressure on the floor 66 that varies with the topography of the surface that the drone 26 moves over. The pressure registers as a change in the localized optical properties of the floor 66. Another inspection sensor, an imaging device 70, illuminates the floor 66 and takes images that can then be analyzed according to the optical properties to determine the topography of the surface. The imaging device 70 is also situated to take images of the surface through the floor 66. The density (spacing) of the feelers 68 can be selected to achieve a desired topographic resolution, where higher density (shorter spacing) provides higher resolution and lower density (longer spacing) provides lower resolution. Among the drones 26, the selected resolutions may vary in order to provide a wider range of inspection capability, such as an ability to re-inspect an abnormality at a high resolution.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. An inspection system for a gas turbine engine, the system comprising:
   a team of terrestrial drones each equipped with at least one inspection sensor;
   at least one processor configured to:
       choreograph operation of the terrestrial drones such that each of the terrestrial drones moves along an associated drone-specific inspection path and the terrestrial drones collectively traverse an area of interest in a gas turbine engine, and
       operate the inspection sensor of each of the terrestrial drones to collect inspection data along the associated drone-specific inspection path,
       wherein each of the terrestrial drones includes a chassis defining a first, terrestrial side and a second, opposite side, a transparent floor mounted in the chassis, and the at least one inspection sensor includes an imaging device mounted on the chassis and situated to take images of the first side through the transparent floor, and the transparent floor includes an array of feelers extending therefrom on the first side, the feelers moving across an inspection surface and exerting pressure on the floor that varies with topography of the surface, the pressure registering as a change in localized optical properties of the floor, and the imaging device illuminating the floor and the at least one processor determining the topography of the inspection surface based on the localized optical properties of the floor.

2. The inspection system as recited in claim 1, wherein the at least one processor is configured to identify whether there is a need for deviation of one of the terrestrial drones from the associated drone-specific inspection path and, if there is the need, provide an instruction for the one of the terrestrial drones to deviate from the associated drone-specific inspection path.

3. The inspection system as recited in claim 2, wherein the need is based on detection of an abnormality along a portion of the associated drone-specific inspection path of a first one of the terrestrial drones, and the instruction is for the first one of the terrestrial drones to retrace the portion of the associated drone-specific inspection path and provide confirmation of the detection of the abnormality.

4. The inspection system as recited in claim 2, wherein the need is based on detection of an abnormality along a portion of the associated drone-specific inspection path of a first one of the terrestrial drones, and the instruction is to summon a second, different one of the terrestrial drones to retrace the portion of the associated drone-specific inspection path and provide confirmation of the detection of the abnormality.

5. The inspection system as recited in claim 4, wherein the at least one inspection sensor includes at least one of an imaging device or a tactile sensor, the detection of the abnormality is based on the inspection data of the imaging device or the tactile sensor, and the confirmation of the detection of the abnormality is based on the inspection data of the other of the imaging device or the tactile sensor.

6. The inspection system as recited in claim 2, wherein the need is based on a time threshold of a first one of the terrestrial drones being exceeded for completing the associated drone-specific inspection path such that there is an uninspected portion of the associated drone-specific inspection path of the first one of the terrestrial drones, and the instruction is to summon a second, different one of the terrestrial drones to move along the uninspected portion of the associated drone-specific inspection path of the first one of the terrestrial drones.

7. The inspection system as recited in claim 1, wherein the at least one inspection sensor includes at least an imaging device and a tactile sensor.

8. The inspection system as recited in claim 1, wherein each drone-specific inspection path is predetermined.

9. A method for inspecting a gas turbine engine, the method comprising:

deploying a team of terrestrial drones in a gas turbine engine, each of the terrestrial drones is equipped with at least one inspection sensor;

choreographing operation of the terrestrial drones such that each of the terrestrial drones moves along an associated drone-specific inspection path and the terrestrial drones collectively traverse an area of interest in the gas turbine engine; and operating the at least one inspection sensor of each of the terrestrial drones to collect inspection data along the associated drone-specific inspection path, wherein each of the terrestrial drones includes a chassis defining a first, terrestrial side and a second, opposite side, a transparent floor mounted in the chassis, and the at least one inspection sensor includes an imaging device mounted on the chassis and situated to take images of the first side through the transparent floor, and the transparent floor includes an array of feelers extending therefrom on the first side, the feelers moving across an inspection surface and exerting pressure on the floor that varies with topography of the surface, the pressure registering as a change in localized optical properties of the floor, and the imaging device illuminating the floor and determining the topography of the inspection surface based on the localized optical properties of the floor.

10. The method as recited in claim 9, further comprising identifying whether there is a need for deviation of one of the terrestrial drones from the associated drone-specific inspection path and, if there is the need, providing an instruction for the one of the terrestrial drones to deviate from the associated drone-specific inspection path.

11. The method as recited in claim 10, wherein the need is based on detection of an abnormality along a portion of the associated drone-specific inspection path of a first one of the terrestrial drones, and the instruction is for the first one of the terrestrial drones to retrace the portion of the associated drone-specific inspection path and provide confirmation of the detection of the abnormality.

12. The method as recited in claim 10, wherein the need is based on detection of an abnormality along a portion of the associated drone-specific inspection path of a first one of the terrestrial drones, and the instruction is to summon a second, different one of the terrestrial drones to retrace the portion of the associated drone-specific inspection path and provide confirmation of the detection of the abnormality.

13. The method as recited in claim 10, wherein the need is based on a time threshold of a first one of the terrestrial drones being exceeded for completing the associated drone-specific inspection path such that there is an uninspected portion of the associated drone-specific inspection path of the first one of the terrestrial drones, and the instruction is to summon a second, different one of the terrestrial drones to move along the uninspected portion of the associated drone-specific inspection path of the first one of the terrestrial drones.

* * * * *